United States Patent [19]

Eskritt et al.

[11] 3,931,433

[45] Jan. 6, 1976

[54] SIMULATED BEVERAGE PULP, BEVERAGE MIX, BEVERAGE PREPARED THEREFROM AND PROCESS

[75] Inventors: James D. Eskritt, Port Hope, Canada; Brian C. Shrimpton, Chipping Warden, England; Linda A. Ven Huizen, North Vancouver, Canada

[73] Assignee: General Foods, Limited, Toronto, Canada

[22] Filed: Dec. 6, 1973

[21] Appl. No.: 422,245

[30] Foreign Application Priority Data

Dec. 8, 1972  Canada ............................. 158827

[52] U.S. Cl. .................. 426/250; 127/29; 426/590; 426/661; 426/599; 426/540
[51] Int. Cl.² ............................................... A23L 1/27
[58] Field of Search ........... 426/366, 190, 365, 215, 426/177, 199, 61, 378, 578, 540, 590, 661, 426/250, 599; 127/29

[56] References Cited
UNITED STATES PATENTS

| | | | |
|---|---|---|---|
| 2,332,074 | 10/1943 | Griffith | 426/199 |
| 3,117,878 | 1/1964 | Anderson | 426/61 |
| 3,316,101 | 4/1967 | Borenstein et al. | 426/177 |
| 3,446,625 | 5/1969 | Blether | 426/190 |
| 3,579,341 | 5/1971 | Trubiano et al. | 426/378 |
| 3,615,589 | 10/1971 | Spek | 426/366 X |
| 3,615,672 | 10/1971 | Pischke | 426/366 X |
| 3,759,714 | 9/1973 | Burkwall | 426/215 |
| 3,788,862 | 1/1974 | Hoover et al. | 426/190 X |
| 3,790,688 | 2/1974 | Walter et al. | 426/177 X |

*Primary Examiner*—S. Leon Bashore
*Assistant Examiner*—Kenneth M. Schor
*Attorney, Agent, or Firm*—Thomas V. Sullivan; Bruno P. Struzzi

[57] ABSTRACT

A simulated beverage pulp is prepared from a pregelatinized starch codried with a water-insoluble dye. A dry beverage mix is obtained by blending the pulp with other ingredients such as food solids which may be of the type desired in the beverage, thickeners such as other starches, gums and the like, sugars, acids, buffers, condiments and flavors. The beverage is prepared by reconstituting the mix with water.

11 Claims, No Drawings

SIMULATED BEVERAGE PULP, BEVERAGE MIX, BEVERAGE PREPARED THEREFROM AND PROCESS

Many attempts have been made to obtain dry beverage mix compositions which, upon rehydration, produce beverages comparable in characteristics to conventional tomato beverages such as juices, soups and the like. However, a number of problems apparently have been encountered such as the inability to reproduce conventional tomato beverage flavors; poor rehydration abilities; failure to simulate conventional tomato beverage viscosities; and inadequate shelf or storage life. A principal problem has been the apparent inability to obtain conventional tomato beverage textures or mouthfeel and to secure proper hydration and appearance of the pulpy particles.

Commercial tomato juice is composed of tomato solids suspended in a liquid serum. The serum is a clear solution containing most of the tomato flavor, acids, salts, sugars, etc. The suspended solids are mainly tomato tissue, cells, fragmented cells and skin, tacheids, seed envelopes, etc. These particles give tomato juice both its characteristic soft, pulpy mouthfeel and its red color.

Conventional thickening agents such as gums and water soluble colors reproduce this two phase system of tomato juice only with extreme difficulty as neither will remain in the solid phase when dispersed in water.

Illustrative methods for the preparation of tomato type beverage mixes or composition appear in such patents as U.S. Pat. Nos. 2,392,241; 2,428,636; 2,912,338; 2,959,486 and U.K. Pat. No. 1,194,804. All of these methods, however, rely upon the presence of tomato solids from tomato juice or tomato paste to yield the desired tomato beverage when the mix is reconstituted with water.

Related to these methods is the method of application Ser. No. 167,019, filed July 28, 1971, said application having now been abandoned, which discloses and claims the codrying of tomato solids with a starch material or specific gum and grinding the dried product so as to obtain a dehydrated reconstitutable tomato beverage composition.

The present invention is based upon the unexpected finding that a simulated beverage pulp may be obtained by codrying a pregelatinized starch with a water-insoluble dye. The pulp, when combined with other powdered ingredients, is found to readily reconstitute in cold water to resemble closely a natural beverage such as tomato juice. An essential feature of the present invention is that the simulated beverage pulp is prepared without having to employ tomato solids such as may be obtained from tomato pastes, purees, sauces or juices. Nevertheless, it is within the ambit of this invention to incorporate such tomato solids with the pregelatinized starch and the water-insoluble dye which are codried and also to include them with other ingredients which are dry-blended with the simulated beverage pulp prepared by codrying the pregelatinized starch and the water-insoluble dye.

Previously, attempts to dye starches have produced a pulp which allows the dye to leach out in water, yielding a dyed water solution and a colorless pulp. By codrying a mixture of a pregelatinized starch and a water-insoluble dye a simulated beverage pulp is obtained which retains the desired color, typically red, when rehydrated in water.

The simulated beverage pulp may be prepared by mixing an aqueous suspension of the water-insoluble dye with the pregelatinized starch to form a paste at approximately 50% moisture. The paste may then be dried on a drum drier to about 2% to 8% moisture and the resulting solid crushed to a specific particle size ranging from 10 to 100 mesh U.S. screen size. This final particle size will affect the "pulpiness" and appearance of the product upon reconstitution.

Other ingredients may be added to the paste before it is dried in order to improve certain of the characteristics desired in the mix and in beverage. Thus, tomato solids may be added to improve the appearance, mouthfeel and flavour; surface active agents to improve mouthfeel and dispersibility; rapidly soluble solids to improve dispersibility; and clouding agents to improve appearance.

The pregelatinized starch may be any one or more of a large number of starches such as, for example, waxy maize, corn, tapioca, potato and the like which may be modified and whose characteristics are such that they swell in cold water to a controlled degree. Illustrative of such starches are National's "Instant Plus", a pregelatinized modified waxy maize starch, National's "Textaid", a pregelatinized modified tapioca starch, and Staley's "Binasol", a pregelatinized modified tapioca starch. Of these, National's Instant Plus is preferred.

The simulated beverage pulp is generally present in the beverage mix in an amount ranging from about 10% to about 60%, preferably 40%. However, other ingredients such as food solids, other starches, thickeners, gums, sugars, surface active agents and clouding agents may require the use of the pulp at the upper or lower end of these ranges.

In general, the ingredients making up the dry beverage mix of this invention are divided into two classes:

a. Liquid phase ingredients — These ingredients are soluble in cold water and form the clear liquid serum of the reconstituted product. Included are sugars, salt, acids, buffers, surface active agents, imitation flavors, etc.

b. Solid phase ingredients — This ingredient is a simulated tomato pulp which is produced by staining the granules of a suitable starch with a water-insoluble dye. The starch granules are partially gelatinized and chemically modified in a way that limits the extent to which they may swell in cold water. Instant Plus, a modified waxy maize starch supplied by National Starch Company, has been found satisfactory. A suitable water-insoluble dye is canthaxanthin, but other carotenoids and insoluble food use-approved dyes may also be used. Food solids and other starches, thickeners, gums, clouding agents may also be included among these solid phase ingredients.

Codrying may be accomplished over a wide temperature range employing drum drying, air drying, or the like. The pregelatinized starch granules are swollen in the presence of the dye and water in the "nip" of the drum dryer. The dye is thus able to penetrate into the granules and is held there by chemical and/or physical forces. When the dyed, pregelatinized granules are dried on the drum, the water is removed leaving the dye behind. The binding of the dye to starch is strong enough to prevent it from leaching out in aqueous solution.

When food solids such as tomato paste are included with the starch and dye, the drying temperatures for the particular admixture are maintained sufficiently low so as to avoid scorching and development of off-flavor notes.

The particular method of sub-dividing or grinding the simulated beverage pulp is not critical. In general, however, the particle size of the simulated beverage pulp particles can be chosen so that upon rehydration the most desired texture for a reconstituted beverage after grinding can be obtained. Thus, the physical form of the simulated beverage pulp appears to be essential to be controlled, with platelets or similar physical forms necessary for the proper pulpiness to be developed.

The beverage mix prepared from the simulated beverage pulp is readily reconstitutable with cold water and the finished beverage is characterized by the viscosity, taste, texture and general appearance of a conventional tomato beverage such as tomato juice. However, it is possible to alter, modify or substitute many of the ingredients comprising the beverage mix so as to obtain a beverage mix which, when reconstituted with water or other potable liquid, furnishes other types of beverages. Thus, for example, food solids from fruits and/or vegetables may be combined as ingredients in the beverage mix such that the finished beverage resembles a blended vegetable drink, aperitif or cocktail.

In order to further illustrate the present invention, the following non-limiting examples are furnished.

EXAMPLE I

A simulated tomato pulp is produced by mixing the following ingredients to form a stiff paste:

| Ingredients | Parts by Weight |
| --- | --- |
| Tomato paste (containing 25% solids) | 64 |
| "Instant Plus" starch (manufactured by National Starch) | 24 |
| Canthaxanthin (dispersed in 10 parts of water) | 0.41 |
| Water | 580 |

This paste is then dried on a steam heated drum drier to a moisture content of 2%. The dried product is then ground so as to pass through a 35 mesh U.S. screen.

EXAMPLE II

The procedure of Example I is repeated in all respects except that the tomato paste is omitted.

EXAMPLE III

The following ingredients are dry-blended to prepare a dry beverage mix:

| Ingredients | Parts by Weight |
| --- | --- |
| Sugar | 18.0 |
| Salt | 7.2 |
| Monosodium Glutamate | 2.4 |
| Citric Acid | .94 |
| Malic Acid | .62 |
| Ascorbic Acid | .21 |
| Sodium Dihydrogen Phosphate | 1.3 |
| Imitation Tomato Flavor | .42 |
| Silicon Dioxide | .71 |
| Simulated Tomato Pulp (prepared according to Example I or Example II) | 40.0 |

Two and a half ounces of the beverage mix prepared above is reconstituted with 24 ounces of cold water. The mix forms a beverage which resembles natural tomato juice both in appearance and mouthfeel.

Although the present invention has been described in conjunction with certain preferred embodiments, features and materials, ingredients, and compounds, it is apparent many suitable alternatives will be apparent to those skilled in the art. Accordingly, the invention is not to be restricted or limited except by the following appended claims.

The embodiments of the invention in which an exclusive property or privilege is claimed are defined as follows:

1. A simulated beverage pulp comprising a codried pregelatinized starch and a water-insoluble dye.

2. A simulated pulp as defined in claim 1 in which the starch is a cold water-swellable modified waxy maize starch.

3. A simulated beverage pulp as defined in claim 2 in which the water-insoluble dye is canthaxanthin.

4. A simulated beverage pulp as defined in claim 3 further comprising tomato solids codried with said starch and said dye.

5. A beverage mix adapted to be reconstituted with water comprising a simulated beverage pulp comprising a codried, pregelatinized starch and a water-insoluble dye, sugar, acid, buffer and flavor.

6. A beverage mix adapted to be reconstituted with water comprising a simulated beverage pulp comprising a codried pregelatinized starch, a water-insoluble dye, and tomato solids, sugar, acid, buffer and flavor.

7. A beverage prepared by reconstituting the beverage mix as defined in claim 5.

8. A beverage prepared by reconstituting the beverage mix as defined in claim 6.

9. A process for preparing a simulated beverage pulp comprising admixing a pregelatinized starch with a water-insoluble dye, codrying the mixture and grinding the codried admixture to a fine powder.

10. A process as defined in claim 9 in which codrying is carried out on a drum drier and said starch is a cold water-swellable modified waxy maize starch.

11. The process as defined in claim 10 further comprising admixing tomato solids with said starch and said dye.

* * * * *